United States Patent [19]

Giles

[11] 4,306,521

[45] Dec. 22, 1981

[54] FILTERS FOR PARTICULATE MATTER IN FLUIDS

[75] Inventor: Michael J. Giles, Solihull, England

[73] Assignee: BL Cars Limited, London, England

[21] Appl. No.: 123,379

[22] Filed: Feb. 21, 1980

[51] Int. Cl.³ .............................................. B01D 35/02
[52] U.S. Cl. ................................. 123/41.15; 210/445; 210/512.1
[58] Field of Search .......................... 123/41.42, 41.15; 210/435, 445, 512 R, 788, 304, 512.1, 512.2

[56] References Cited

U.S. PATENT DOCUMENTS

| | | | |
|---|---|---|---|
| 2,118,510 | 5/1938 | Hromadka | 123/41.15 |
| 2,302,116 | 11/1942 | Gill | 210/512 R |
| 3,321,083 | 5/1967 | Thornton | 123/41.42 |
| 3,558,484 | 1/1971 | Carr | 210/512 R |
| 3,819,053 | 6/1974 | Milotich | 210/512 R |

*Primary Examiner*—Ivars C. Cintins
*Attorney, Agent, or Firm*—Brisebois & Kruger

[57] ABSTRACT

A filter for fluids has a chamber into which fluid is fed in such manner that it forms a vortex. Particulate matter tends to collect at the center of the vortex, leaving filter material in the wall of the chamber located away from the center of the vortex clear of clogging particulate matter. The filter is described in relation to its use in a vehicle coolant circuit wherein it removes particulate matter which would otherwise tend to block heat exchangers incorporated in the circuit.

11 Claims, 4 Drawing Figures

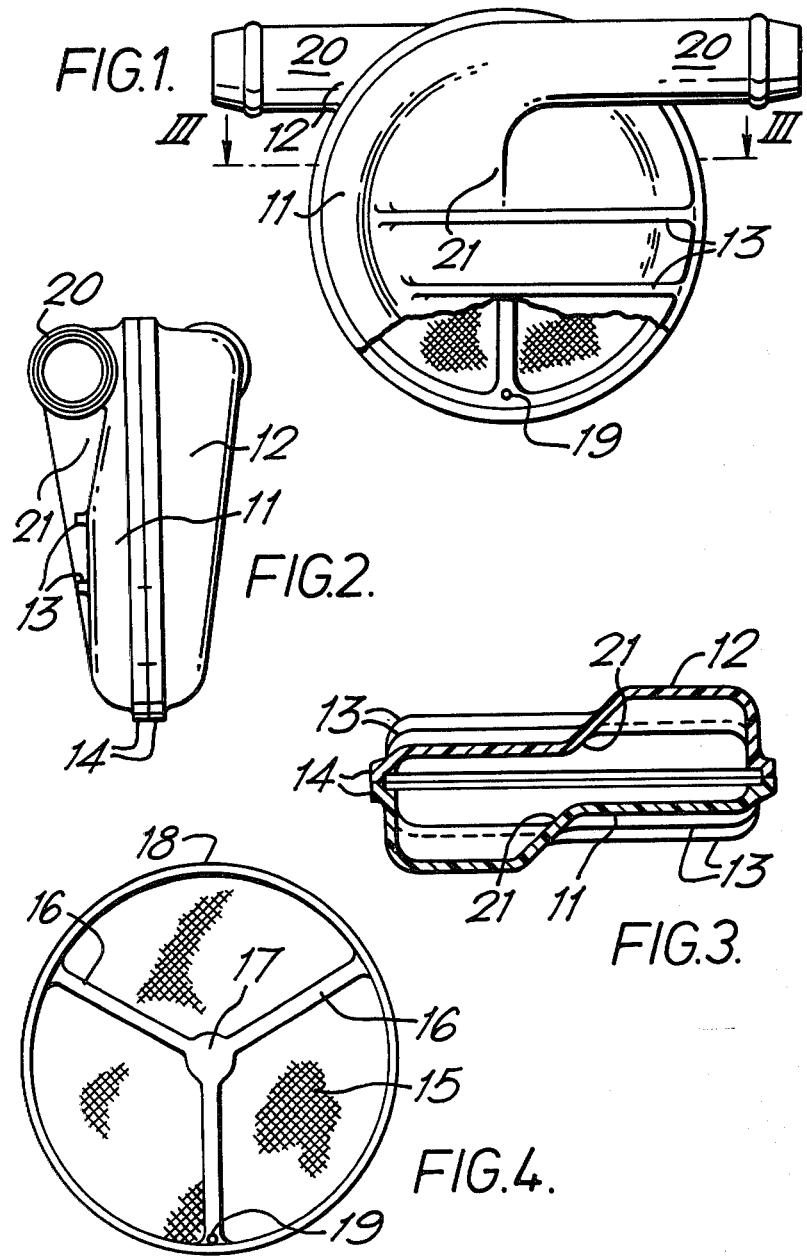

FILTERS FOR PARTICULATE MATTER IN FLUIDS

This invention relates to filters for removing particulate matter from fluids.

In the past filters for fluids have commonly suffered from clogging of the filter material by the particulate matter. To extend the service life of filters between cleaning or disposal of the filter material, various methods have been employed for displacing clogging matter, including vibrating the filter, rotating it to remove the matter by centrifugal action, and arranging for the unfiltered fluid to flow across as well as through the filter material.

The present invention provides a filter for removing particulate matter from a fluid, having a chamber with an inlet and an outlet, arranged such that incoming fluid generates a vortex within the chamber, and having filter means across the outlet disposed such that, in use, particulate matter collecting around the centre of the vortex tends to leave at least part of the filter means clear of particulate matter.

Preferably the flow in said chamber is rendered turbulent to assist transport of particulate matter to the centre of the vortex.

An embodiment of the invention will now be described by way of example and with reference to the accompanying drawings, in which:

FIG. 1 is a side view of a filter in accordance with the invention with its outer casing shown partly broken away;

FIG. 2 is an end view of the filter of FIG. 1;

FIG. 3 is a cross section through the casing of the filter of FIG. 1 taken along the line III—III; and FIG. 4 is a side view of the filter element of the filter of FIG. 1.

The drawings show a filter for incorporation in the hot water circuit of a motor vehicle's air-conditioning system. Hitherto the heat exchangers and hot water circuits of vehicle heating systems have tended to clog with swarf and other matter which tends to be left in the vehicle engine after production, and subsequently circulated to the air conditioning unit. It is proposed to incorporate a filter in the air conditioning circuit to prevent such clogging, and whilst it is possible to incorporate a filter as a permanent feature of the air conditioning system, it may frequently be preferred to incorporate a disposable filter which will operate for say the first 1000 miles of the vehicle's life, and is then disposed of, having collected the majority of the debris resulting from the manufacturing process.

The filter illustrated comprises a two part plastics casing consisting of two identical injection moulded halves 11 and 12. Each half casing is stiffened by ribs 13 and is sonic-welded to the other half casing around the edges of an annular flange 14 to produce a water tight joint to contain a pressure of about three atmospheres. The annular flanges 14 locate and together retain in place a filter means comprising a circular area of filter material 15 consisting of nylon mesh with apertures of 680 microns, supported by a plastics frame having three equi-spaced arms 16 meeting at a central boss 17 and joined at their radially outer ends by a rim 18. Rim 18 is provided with a pin 19 extending perpendicular to the plane of the mesh 15, which locates in a hole in each of the casing halves 11, 12, to prevent sliding rotation of the filter means within the casing.

Each of the casing halves has a nozzle 20 for connection to a rubber hose to serve as an inlet or outlet for the filter. It will be noted that the nozzles 20 are parallel to each other and point in opposite directions, which facilitates omission of the filter when no longer required, since the two rubber hoses can be joined by a short straight length of pipe.

As can be seen particularly from FIGS. 2 and 3 the greater part of the surface of each casing half is very approximately helical in form. Thus the chamber defined between a casing half and the filter means is so shaped that when cross-sections are taken on radial planes from the centre of the filter means, the maximum cross-sectional area of the chamber occurs where the nozzle 20 connects with the chamber. The chamber area then diminishes gradually as it leads on a circular path away from the nozzle around the centre of the filter means (taking an anti-clockwise path around, say, the nearer chamber viewed in FIG 1), until the path returns to the start where a wall portion 21 of the chamber extends substantially radially to produce an abrupt change in radial cross-sectional area.

In use, water with entrained particulate matter flows into the filter via one of the nozzles 20, entering a chamber defined by the casing half and the filter means, as described above. Due to the tangential entry of water into the chamber and the generally circular cross-section in side view, the water within the chamber is caused to swirl about the centre of the chamber, that is to say about an axis extending through boss 17 perpendicular to the plane of the filter means. Because of the diminishing cross sectional area of the chamber available to the water as it flows in its circular path, the water velocity is substantially maintained despite some water having passed out of the chamber through the nylon mesh 15, which constitutes an outlet into the adjacent chamber formed by the other casing half and the filter means. As some of the water recirculates in the first chamber it passes wall portion 21 which has the effect of a submerged weir, turbulating the recirculating flow. A more significant source of turbulence in the flow is caused by the equi-spaced arms 16 which interrupt flow over the face of the mesh.

The effect of the above flow pattern is thus broadly to establish a vortex in the chamber. The entrained particulate matter which is too large to pass through the mesh is encouraged by the turbulent flow across the face of the filter to continue recirculating in the vortex. The tendency then is for the particulate matter to collect at the centre of the vortex leaving the majority of the filter material radially outward of the centre clear and free to pass water. The rapidity with which the particles move to the centre is increased by the turbulence in the recirculating flow which by breaking down laminar circular flow paths assists transport of the particles to the centre.

Water which has passed through the mesh flows out of the other nozzle 20, filtered of particulate matter.

The filter may be cleaned to an extent, if desired, by removing it from the system and subjecting it to reverse flow, in effect to blow the collected particulate matter out of the 'inlet' nozzle. Of course, if the filter is required to have an indefinite life the two casing halves could be detachably secured together to enable the filter to be dismantled and cleaned, and possibly to have the filter means replaced. This would also enable the mesh size to be varied to enable the filter application to be varied.

As described however, it will be seen that the filter is simple and cheap to manufacture, having few parts with none moving in operation. The filter exhibits very low back-pressure and moreover this is largely maintained over its service life due to the cleaning effect of the vortex which provides the filter with a considerably prolonged life as compared to a linear flow filter.

It will be appreciated that the filter can be modified substantially without departing from the overall concept of the invention. For example the relative orientation of the casing halves could be altered so that the nozzles are non-parallel, or parallel and both facing in the same direction for example, according to mounting requirements. Also while the shape of the casings illustrated is preferred, it could be modified, for example by altering the helical side surfaces so that the chamber is a square-ended cylinder. Also, the filter means could be altered both in its mesh size and its nature for various fluid/matter combinations; for example for removing large particles of matter the whole filter could be enlarged and a pierced metal sheet used for the filter means. Again, whilst the filter is shown located perpendicular to the axis of the vortex, it could be located elsewhere in the wall of the chamber with at least part of its area remote from the centre of the vortex where the particulate matter collects; for example at the outer edge of the vortex. It will be clear that the casing shape could be varied considerably in accord with these changes the outlet chamber could be annular and surround the main chamber containing the vortex, the two chambers being separated by an annular filter; or indeed in the example, the outlet casing half could be dispensed with and be replaced, for example, by a funnel shaped member axially aligned with the vortex.

The illustrated arrangement should, however, be suitable, after due variation of dimensions, for filtering particulate matter at least from most low viscosity fluids such as air, fuel etc.

What is claimed is:

1. A filter for removing particulate matter from a fluid, comprising, a chamber having an inlet and an outlet, filter means in said chamber between said inlet and outlet, said filter means having an upstrem face and a downstream face, and means for directing fluid flowing through the chamber to form a vortex in said chamber upstream of said filter means, said vortex inducing substantial fluid flow across the upstream face of the filter means and causing particulate material to collect adjacent the center thereof to leave at least a portion of the upstream face of the filter means free of particulate material so that liquid can continue to flow through the filter means after the chamber contains a significant amount of particulate material and wherein outgoing fluid leaves the chamber tangentially to promote formation of said vortex.

2. A filter as claimed in claim 1, wherein incoming fluid enters the chamber tangentially to promote formation of said vortex.

3. A filter as claimed in claim 1, wherein said filter means is disposed substantially perpendicularly to the axis of the vortex formed by the fluid.

4. A filter as claimed in any one of claims 1, 2 or 3, including means in said chamber for rendering the fluid flow turbulent.

5. A filter as claimed in claim 1, wherein said chamber is substantially circular in cross-section.

6. A filter as claimed in claim 1 further comprising, means for causing fluid in said vortex to flow axially of the vortex through said filter means.

7. A filter as claimed in claim 6, wherein said means for causing axial flow comprises a helical end wall in said chamber.

8. A filter as claimed in claim 1, wherein said filter has a casing having two identical halves defining said chamber, and said filter means comprises a filter element located between the casing halves.

9. A filter as claimed in claim 8, wherein said casing halves comprise plastic mouldings.

10. An internal combustion engine having a cooling system including a liquid coolant circuit, and a clog resistant filter unit in said circuit, said filter unit comprising, a chamber having an inlet and an outlet, filter means in said chamber between said inlet and outlet, said filter means having an upstream face and a downstream face, and means for directing coolant flowing through the chamber to form a vortex inducing substantial liquid flow across the upstream face of said filter means and causing particulate material to collect adjacent the center thereof to leave at least a portion of the upstream face of the filter means free of particulate material, so that coolant can continue to flow through the circuit after the upstream chamber contains a significant amount of particulate material.

11. An engine as claimed in claim 10, wherein said filter unit is located in the coolant circuit between the outlet from the engine and a heat exchanger in the circuit.

* * * * *